(12) United States Patent
Benayon et al.

(10) Patent No.: US 9,734,461 B2
(45) Date of Patent: Aug. 15, 2017

(54) RESOURCE USAGE CALCULATION FOR PROCESS SIMULATION

(75) Inventors: Jay W. Benayon, Vaughan (CA);
Mariya M. Koshkina, Vaughan (CA);
William G. O'Farrell, Markham (CA);
Vincent F. Szaloky, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1325 days.

(21) Appl. No.: 12/858,695

(22) Filed: Aug. 18, 2010

(65) Prior Publication Data

US 2012/0046984 A1 Feb. 23, 2012

(51) Int. Cl.
*G06Q 10/00* (2012.01)
*G06F 11/34* (2006.01)
*G06Q 10/06* (2012.01)

(52) U.S. Cl.
CPC ......... *G06Q 10/00* (2013.01); *G06F 11/3457* (2013.01); *G06Q 10/06311* (2013.01)

(58) Field of Classification Search
CPC . G06Q 10/00; G06F 11/3457; G06F 2201/86; G06F 2201/87
USPC ................................. 705/1.1, 7.13
See application file for complete search history.

(56) References Cited

U.S. PATENT DOCUMENTS

| | | | |
|---|---|---|---|
| 6,859,446 B1 * | 2/2005 | Gopalakrishnan | H04B 7/264 370/335 |
| 7,436,428 B2 * | 10/2008 | Schrader et al. | 348/14.08 |
| 7,483,970 B2 * | 1/2009 | Anuszczyk et al. | 709/224 |
| 7,626,997 B2 * | 12/2009 | Yoshikawa | 370/447 |
| 7,720,668 B2 * | 5/2010 | Al-Hamwy et al. | 703/22 |
| 7,865,896 B2 * | 1/2011 | Coppinger et al. | 718/104 |
| 8,037,195 B2 * | 10/2011 | Anuszczyk et al. | 709/229 |
| 8,689,227 B2 * | 4/2014 | Blanding | G06F 9/5061 718/104 |

(Continued)

OTHER PUBLICATIONS

Schriber Thoms J and Brunner Daniel T, 1997, Inside discrete-event simulation software how it works and why it matters, proceedings of the 1997 Winter Simulation Conference, pp. 14-22.*
Denney Steve, 1997, Medmodel—healthcare simulation software, proceedings of the 1997 winter simulation conference, pp. 581-586.*
Czarnecki Hank, Schroer Bernard, Rahman, M Mizzanur, 1997, Using simulation to schedule manufacturing resources, proceedings of the 1997 winter simulation conference, pp. 750-757.*

(Continued)

*Primary Examiner* — Matthew Gart
*Assistant Examiner* — Stephen S Swartz
(74) *Attorney, Agent, or Firm* — Marcia L. Doubet

(57) ABSTRACT

Resource usage calculation for process simulation (such as business process simulation). For each resource used by a simulated process, a usage counter object (or similar data structure) is used. In one embodiment, the usage counter object for each resource includes a list of time slots sorted by start times, and another list of time slots sorted by end times, to keep track of currently-scheduled time slots for this particular resource. In another embodiment, the usage counter object for each resource includes a list of time slots, sorted by start times and having associated end times, to keep track of the currently-scheduled time slots for this particular resource. The usage counter objects also store a count of how many units of this resource are currently in use, and a count of how many users are currently using the resource. These counters are updated using the sorted time slot lists.

13 Claims, 9 Drawing Sheets

(56) References Cited

U.S. PATENT DOCUMENTS

| | | | |
|---|---|---|---|
| 8,767,766 B2* | 7/2014 | He | H04L 12/413 370/445 |
| 2003/0028656 A1* | 2/2003 | Babka | 709/229 |
| 2005/0004825 A1* | 1/2005 | Ehrler et al. | 705/8 |
| 2006/0026052 A1* | 2/2006 | Klett et al. | 705/8 |
| 2006/0079982 A1* | 4/2006 | Giebels et al. | 700/99 |
| 2009/0150857 A1* | 6/2009 | Srinivasan | G01R 31/31835 717/104 |
| 2010/0106478 A1* | 4/2010 | Barnett | G06Q 10/06 703/17 |
| 2010/0198776 A1* | 8/2010 | Wang et al. | 706/58 |
| 2011/0295640 A1* | 12/2011 | Valentini et al. | 705/7.19 |
| 2013/0132009 A1* | 5/2013 | Rolia | G06F 1/3209 702/61 |

OTHER PUBLICATIONS

Benson Deborah, 1997, Simulation modeling and optimization using promodel, proceedings of the 1997 Winter simulation conference, pp. 587-593.*

Heflin Deborah L, Harrell Charles R, 1997, Simulation modeling and optimization usign promodel, proceedings of the 1998 Winter simulation conference, pp. 191-197.*

Erkut, Erhan, Ozen Umit, 1996, Aggregate planning for distribution of durable household products: a case study, Journal of Business Logistics, vol. 17, No. 2, 1996, pp. 217-234.*

Akbay, Kunter, 1996, Using simulation optimization to find the best solution, IIE Solutions, pp. 24-29.*

Murphy Frederic H and Panchandam Venkat, 1997, Understanding linear programming models through an examnination of the early papers on model formulation, 45, 3, pp. 341-356.*

* cited by examiner

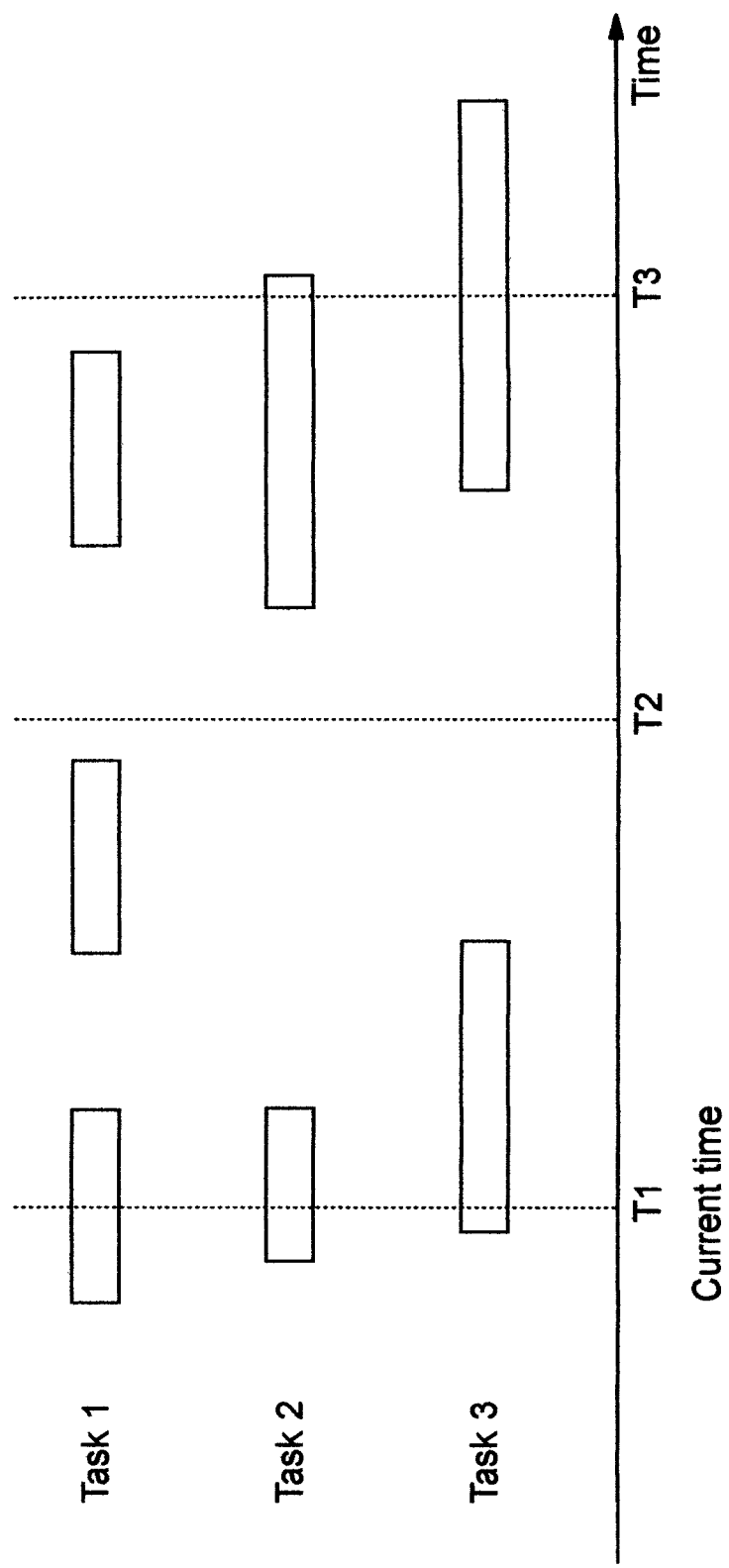

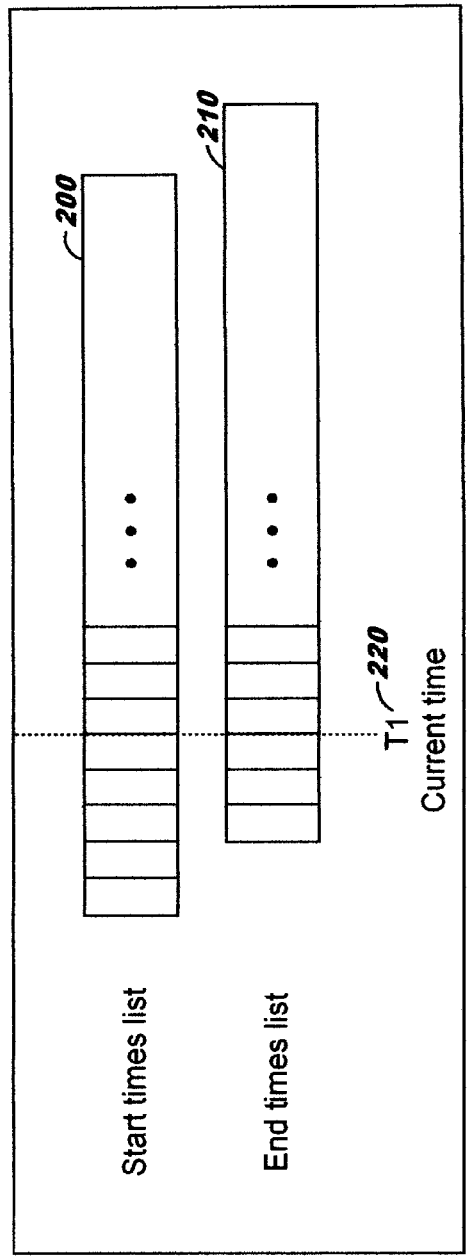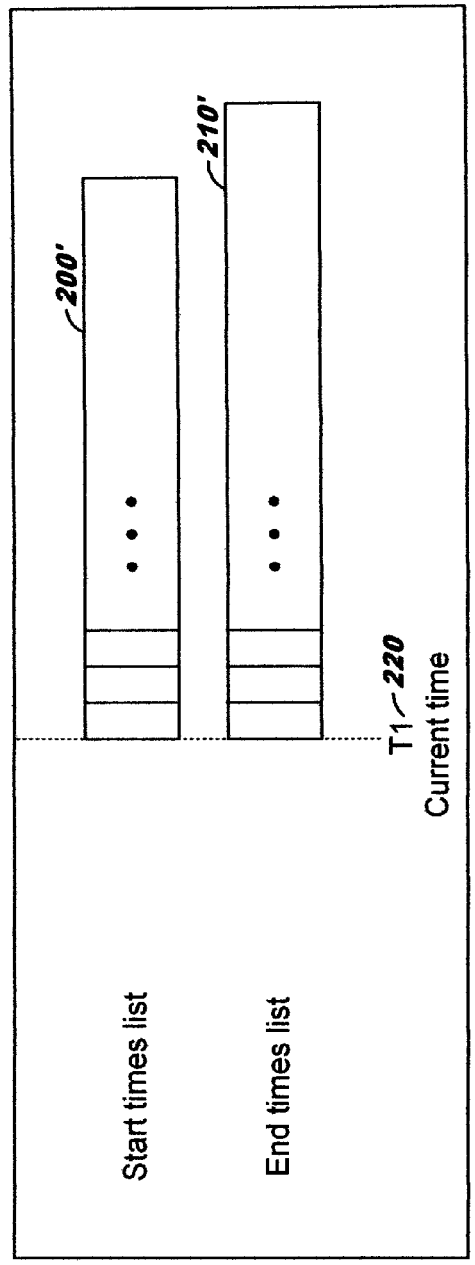

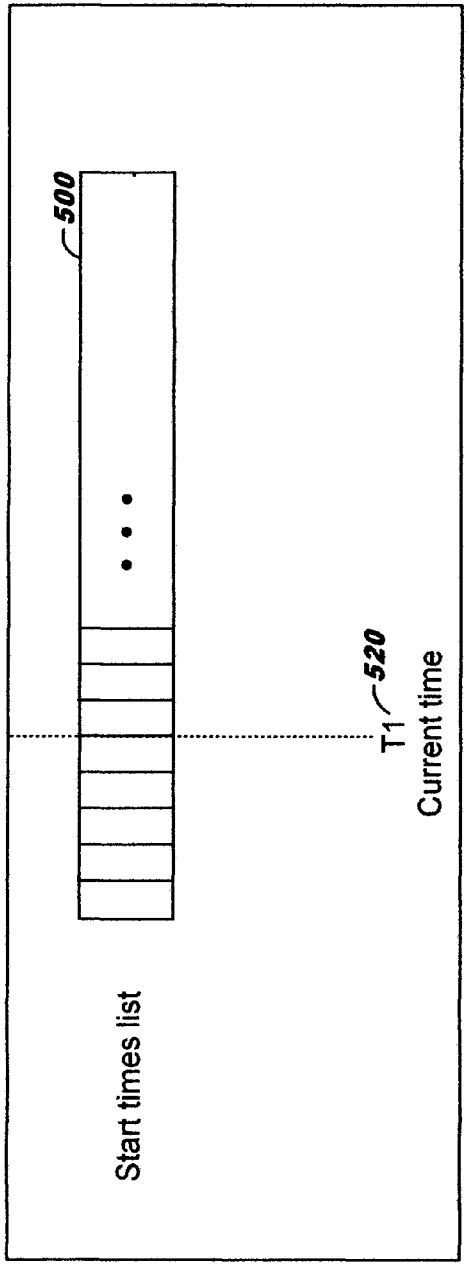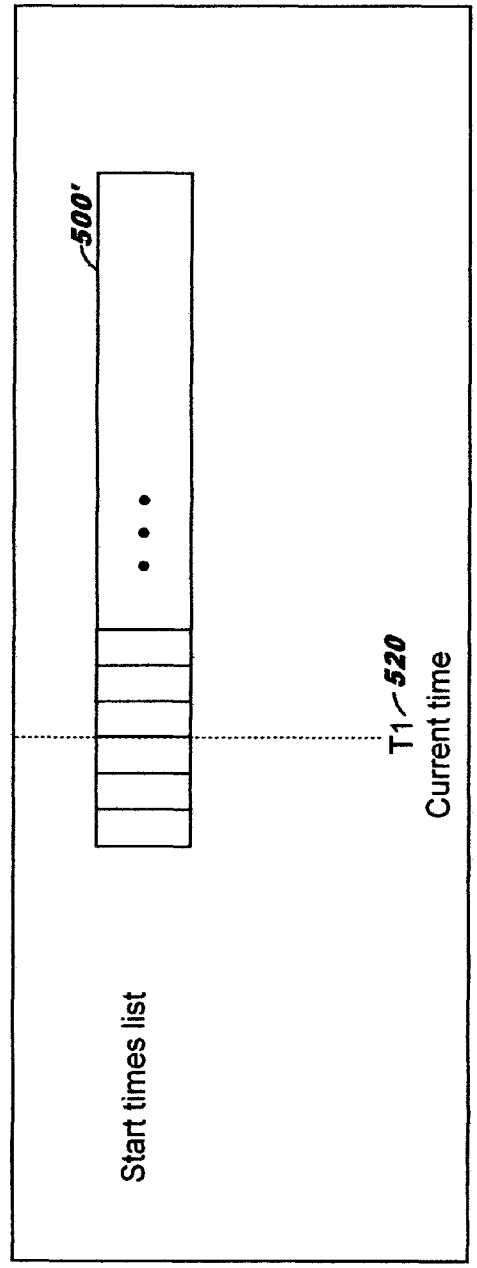

RESOURCE USAGE CALCULATION FOR PROCESS SIMULATION

BACKGROUND

The present invention relates to computing environments, and deals more particularly with process simulation for a computing environment and yet more particularly, with calculating resource usage in such process simulation.

Simulation is an important part of process design, whereby processes can be observed in action. Simulation may be conducted with a business process design, for example, prior to actual process deployment. Statistics can be gathered from the simulation, and various analyses can be performed on the simulation results. Analysts may use simulation of processes in order to determine correctness of the processes, and to find potential problems and/or bottlenecks. Simulating processes also enables understanding resource usage during process execution, so that the processes may be optimized by making adjustments to resource allocation and/or resource utilization, and for better resource planning.

BRIEF SUMMARY

The present invention is directed to calculating resource usage for process simulation in a computing system. In one aspect, this comprises: maintaining a sorted list of all scheduled time slots of a resource, the sorted list sorted by a start time of each of the scheduled time slots; initializing a count of simultaneous units used for the resource and a count of simultaneous users of the resource; selecting, from the sorted list, all of the scheduled time slots for which the start time is less than a current time; and for each of the selected time slots for which an end time thereof is greater than the current time, incrementing the count of simultaneous units used for the resource and incrementing the count of simultaneous users of the resource. In another aspect, this comprises: maintaining a first sorted list of all scheduled time slots of a resource, the first sorted list sorted by a start time of each of the scheduled time slots; maintaining a second sorted list of all scheduled time slots of a resource, the second sorted list sorted by an end time of each of the scheduled time slots; initializing a count of simultaneous units used for the resource and a count of simultaneous users of the resource; selecting, from the first sorted list, all of the scheduled time slots for which the start time is less than a current time; for each of the time slots selected from the first sorted list, incrementing the count of simultaneous units used for the resource and incrementing the count of simultaneous users of the resource; selecting, from the second sorted list, all of the scheduled time slots for which the end time is less than or equal to the current time; and for each of the time slots selected from the second sorted list, decrementing the count of simultaneous units used for the resource and decrementing the count of simultaneous users of the resource.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 1 depicts an example of resource scheduling for a plurality of tasks, for which resource utilization may be simulated using an embodiment of the present invention;

FIG. 2 (comprising FIGS. 2A and 2B) and FIG. 5 (comprising FIGS. 5A and 5B) depict sample data structures which may be used when implementing a first embodiment and a second embodiment, respectively, of the present invention;

DETAILED DESCRIPTION

Figure 3:
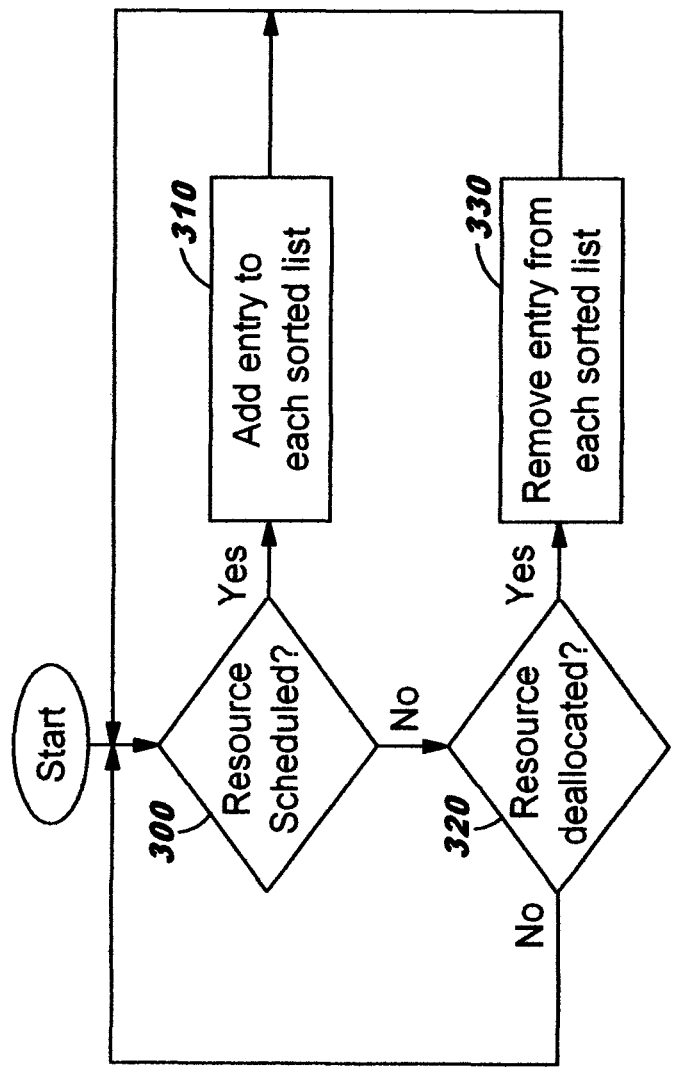
FIGS. 3-4 and 6-7 provide flowcharts depicting logic which may be used when implementing a first embodiment and a second embodiment, respectively, of the present invention.

An embodiment of the present invention is directed toward resource usage calculation for process simulation. The process may be a business process simulation. A resource to be considered in a simulation may be, by way of illustration but not of limitation, an individual, a role (for example, an administrator role), or a bulk resource (such as computers). Resource usage may be calculated using the number of units of a particular resource used at a point in time and the number of simultaneous users at that point in time.

Each task in a process to be simulated typically uses a number of resources, and resources typically have an associated availability schedule. When a task starts during a simulation, its required resources are allocated according to their specific availability schedule, resulting in a number of bookings, also referred to herein as time slots, for each resource. There may be a number of parallel tasks in the simulated process, where more than one of these tasks is using the same resource at the same time. Accordingly, a simulation engine is used to collect resource usage information during the simulation run. At a particular point in time, the simulation engine looks at all the resources being used, in order to record how many units of a particular resource are used at this point in time.

See, for example, the illustration in FIG. 1, which depicts an example of resource scheduling for a plurality of tasks. In this example, 3 tasks are executing, where these tasks may correspond to 3 simultaneous users of the resource (where the resource has multiple units available, in this example). The rectangles shown in FIG. 1 represent scheduled time slots for the resource. At a current point in time T1, each of the 3 tasks is simultaneously using the resource, while at a future point in time T2, none of the 3 tasks is scheduled to use the resource and at another future time T3, 2 of the 3 tasks are scheduled to use the resource. As will be obvious, the illustration in FIG. 1 is a relatively simple example. Resource utilization for this simple simulation example and for much more complex examples may be calculated using an embodiment of the present invention, as will be discussed in more detail herein.

Known techniques for calculating resource usage for a complex simulated process can be quite time consuming, and such calculations may add a large amount of overhead to the simulation processing. In turn, the simulation may be significantly slowed down. For example, the present inventors have conducted a simulation using known techniques for a process with 114 tasks and 16 different resources, with 165 process instances running. In this simulation, more than 30 minutes of the simulation time were spent in calculating resource usage, comprising approximately 80 percent of the total simulation time. Calculating resource usage is therefore considered to be computationally expensive when using known techniques.

Each task in a simulated process may use a number of resources, and each of these resources is scheduled according to its availability schedule. Rather than calculating resource usage at a particular point in time by iterating through all active tasks to find all users of the resource, which may take a considerable amount of time for a complex process involving many instances of the process running simultaneously, an embodiment of the present invention calculates resource usage using an auxiliary data structure, or auxiliary data structures, for faster access to relevant resource bookings. In the above-discussed example of a process with 114 tasks and 16 different resources, with 165 process instances running, an embodiment of the present invention used approximately 10 percent of simulation time for resource usage calculation (as opposed to 80 percent using known techniques).

Two embodiments of a resource usage calculation will now be described, according to techniques disclosed herein. To determine how many units of a particular resource are being used, a map of all resources is kept, by resource type. For each resource, a usage counter object is used in preferred embodiments. In one embodiment, each usage counter object contains multiple auxiliary data structures to keep track of currently-scheduled time slots for this particular resource. In another embodiment, each usage counter object contains a single auxiliary data structure to keep track of the currently-scheduled time slots for this particular resource. In either case, these data structures are used to provide relatively fast access to information when calculating resource usage, according to techniques disclosed herein. A tradeoff may be made between CPU usage and memory usage. Accordingly, while the first described embodiment may require less CPU usage, the second described embodiment may require less memory usage.

The usage counter object which may be used to store information for a resource when implementing a first embodiment of the present invention preferably contains a field to store a count of simultaneous units used; a field to store a count of simultaneous users; a sorted list of time slots, sorted by their start time; and another sorted list of time slots, sorted by their end time. A time slot preferably represents an individual user of the resource; accordingly, if multiple users are using the same resource at the same start time, then a distinct time slot is created for each of these users. Each time slot preferably has associated therewith a number of units, indicating how many units of the resource are used in that time slot. As will be obvious to those of ordinary skill in the art, a usage counter object is one way of organizing this information, but other storage structures may be used without deviating from the scope of the present invention. Preferably, red and black tree implementations are used for the sorted lists, as such tree implementations are known to have efficient insert, delete, and search times. (Red and black tree implementations are well known in the art, and a detailed discussion thereof is therefore not deemed necessary herein.)

FIG. 2A depicts sample data structures 200, 210 storing sorted lists for the time slot start times and the time slot end times for a resource. As shown therein, some of the start times and end times occur prior to the current time T1 (which is denoted at 220).

Figure 4:
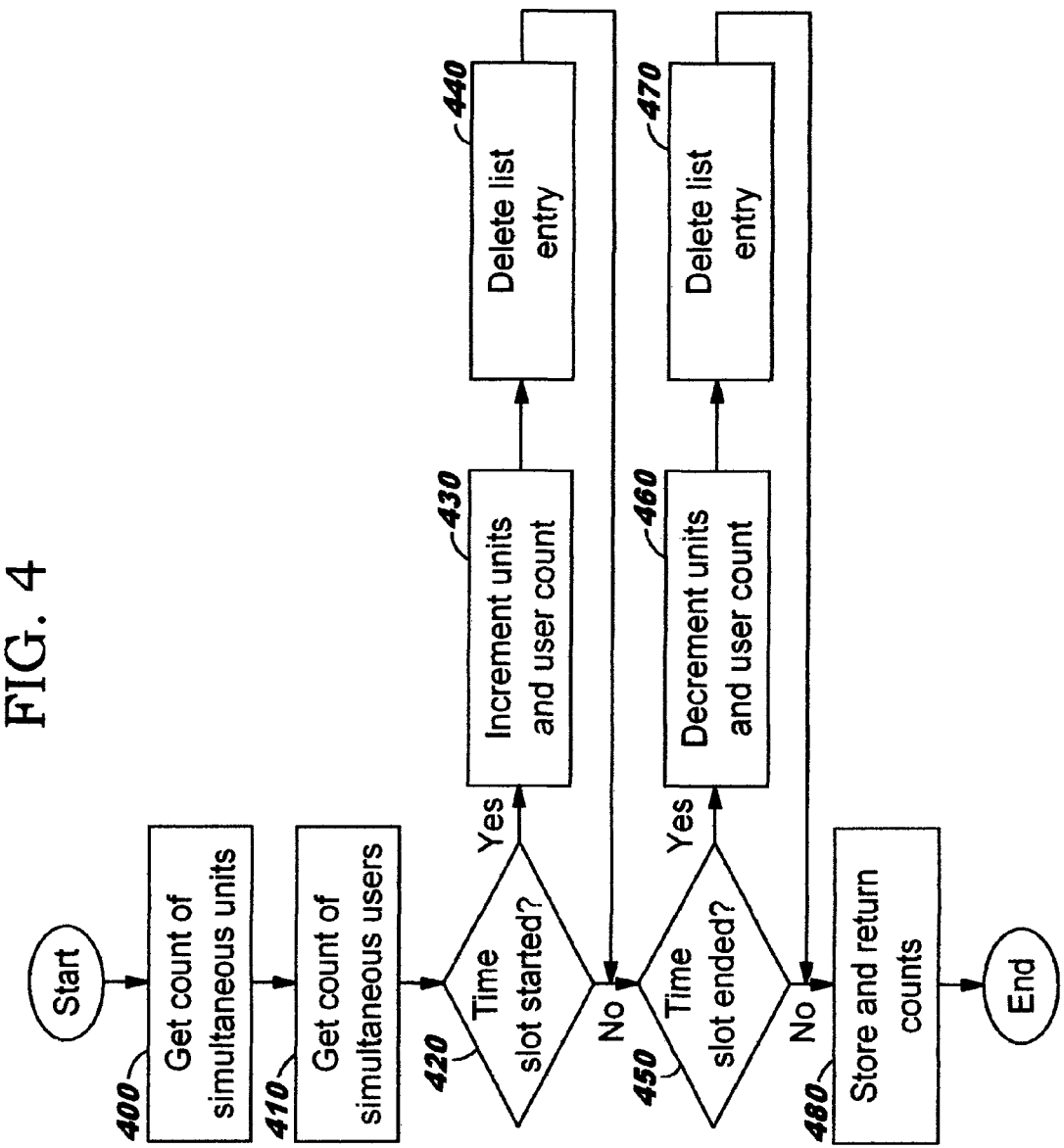

FIGS. 3 and 4 provide flowcharts depicting logic which may be used when implementing the first embodiment of the present invention, as will now be described.

FIG. 3 corresponds to maintaining entries in the sorted lists 200, 210 of the usage counter object. When a resource is scheduled or deallocated (see Blocks 300 and 320, respectively), the two sorted lists are updated to add new time slots or to delete existing time slots, respectively (see Blocks 310 and 330). For example, if a resource is scheduled, a time slot corresponding to the scheduled starting time is added to list 200, and a time slot corresponding to the scheduled ending time is added to list 210.

FIG. 4 corresponds to performing calculations by the simulation engine. The two count fields of the usage counter object are updated every time the simulation engine requests resource usage statistics, and these count values are used as initial values in the next iteration by the simulation engine. Accordingly, the processing in FIG. 4 begins, upon a request for resource usage statistics, by obtaining the previously-counted number of simultaneous units in use (Block 400) and the previously-counted number of simultaneous users (Block 410) from the count fields of the usage counter object. A determination is then made (Block 420) of all time slots that have started—that is, all time slots where the start time is less than the current time. For each such determined time slot, the count of simultaneous units and the count of simultaneous users are each incremented (Block 430). The count of simultaneous units is incremented, for each determined time slot, by the number of units associated with this time slot. The count of simultaneous users is incremented by 1, for each determined time slot. As each of the determined time slots (i.e., each time slot which is determined to have started) is counted, that time slot is deleted from the sorted start-time list 200 (Block 440). Then, a determination is made (Block 450) of all time slots that have ended—that is, all time slots where the end time is less than or equal to the current time. For each such determined time slot, the count of simultaneous units and the count of simultaneous users are each decremented (Block 460). The count of simultaneous units is decremented, for each determined time slot, by the number of units associated with this time slot. The count of simultaneous users is decremented by 1, for each determined time slot. As each of the determined time slots (i.e., each time slot which is determined to have ended) is counted, that time slot is deleted from the sorted end-time list 210 (Block 470). The updated count of simultaneous units and the updated count of simultaneous users are then stored into the usage counter object, and are also preferably returned to the invoking logic (Block 480).

Suppose, by way of illustration, that the number of simultaneous users of a particular resource on a previous iteration of the processing of FIG. 4 was determined to be 2. The usage counter for the resource therefore stores this count value. Using the sample lists of FIG. 2A, Block 430 increments the user count by 5 when evaluating the start times list 200, representing the 5 list entries that start before the current time T1. The count of users is then 7. Block 460 decrements the user count by 3 when evaluating the end times list 210, representing the 3 list entries that end before, or at, the current time T1. The count of users is then 4, in this example, and this value is then stored in the usage counter object as the simultaneous user count, and is also returned to the invoking logic, by Block 480. (As stated above, this updated simultaneous user count will also be used as the initial user count for the next time the processing of FIG. 4 is executed.)

FIG. 2B shows the lists 200, 210 of FIG. 2A as they appear after the processing of FIG. 4, with the sample data. That is, updated start time list 200' now reflects the deletion of all of the entries which were counted at Block 430 and therefore deleted at Block 440, and updated end time list 210' now reflects the deletion of all of the entries which were counted at Block 460 and therefore deleted at Block 470.

As can be appreciated in view of the processing illustrated in FIG. 4, selection of entries from the sorted lists is relatively fast. Deleting entries from the sorted lists after the entry has been counted ensures that the lists are kept relatively short.

The usage counter object which may be used when implementing a second embodiment of the present invention preferably contains a field to store a count of simultaneous units used; a field to store a count of simultaneous users; and a sorted list of time slots, sorted by their start time. As in the first embodiment, a time slot preferably represents an individual user of the resource, and each time slot preferably has associated therewith a number of units, indicating how many units of the resource are used in that time slot. As will be obvious to those of ordinary skill in the art, a usage counter object is one way of organizing this information, but other storage structures may be used without deviating from the scope of the present invention. Preferably, a red and black tree implementation is used for the sorted list, as noted above with regard to the first embodiment.

FIG. 5A depicts a sample data structure 500 storing a sorted list for the time slot start times. As shown therein, some of the start times occur prior to the current time T1 (which is denoted at 520).

Figure 6:
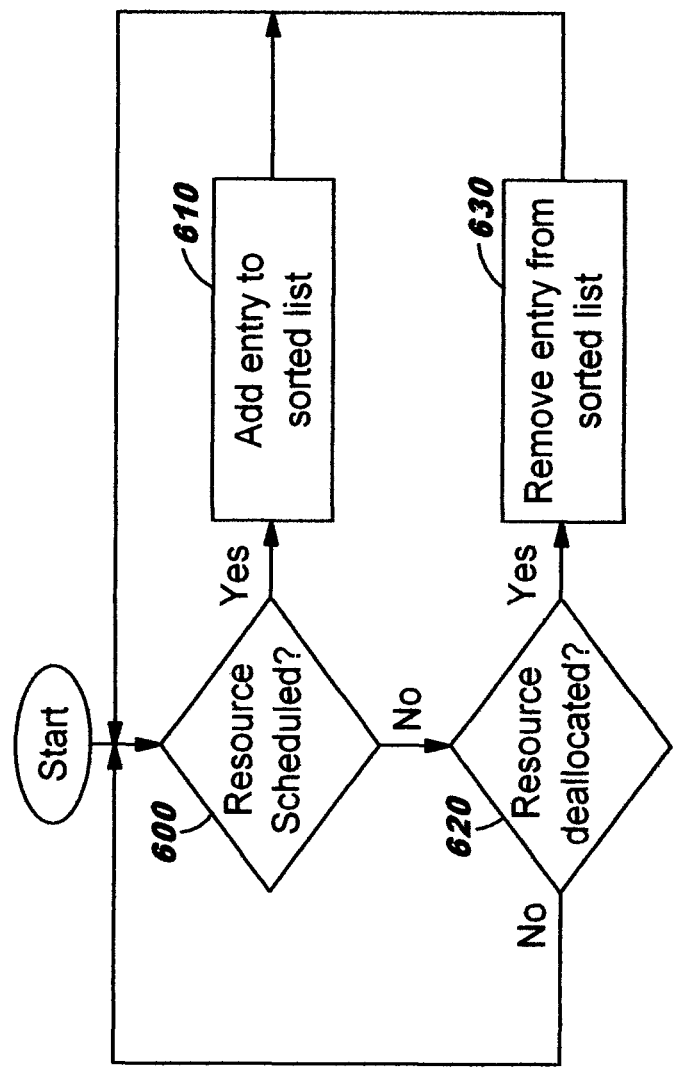
Figure 7:
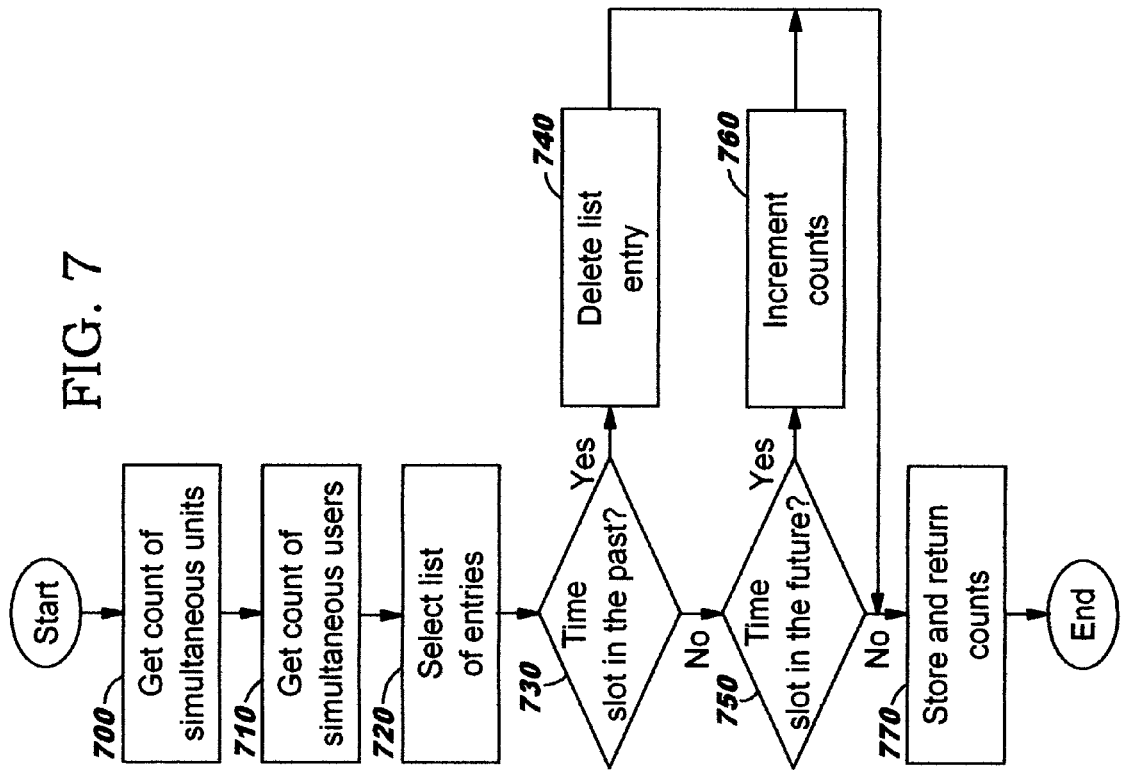

FIGS. 6 and 7 provide flowcharts depicting logic which may be used when implementing the second embodiment of the present invention, as will now be described.

FIG. 6 corresponds to maintaining entries in the sorted list 500 of the usage counter object. When a resource is scheduled or deallocated (see Blocks 600 and 620, respectively), the sorted list is updated to add new time slots or to delete existing time slots, respectively (see Blocks 610 and 630). For example, if a resource is scheduled, a time slot corresponding to the scheduled starting time is added to list 500, and when a resource is deallocated, a time slot corresponding to the scheduled ending time is deleted from list 500.

FIG. 7 corresponds to performing calculations by the simulation engine. The two count fields of the usage counter object are updated every time the simulation engine requests resource usage statistics, and these count values are used as initial values in the next iteration by the simulation engine. Accordingly, the processing in FIG. 7 begins, upon a request for resource usage statistics, by obtaining the previously-counted number of simultaneous units in use (Block 700) and the previously-counted number of simultaneous users (Block 710) from the count fields of the usage counter object. Next, a list is made (Block 720) of all the time slots that have already started—that is, all time slots where the start time is less than the current time. The entries in this list are then evaluated, examining the end time. If the end time is in the past (Block 730)—that is, the current time is greater than or equal to the end time—this indicates that the time slot is already finished. Accordingly, each of these already-ended time slots is deleted from the start-time list 500 (Block 740). If the end time is in the future (Block 750)—that is, the current time is less than the end time—then the count of simultaneous units and the count of simultaneous users are each incremented (Block 760). For each of these time slot that ends in the future, the incrementing at Block 760 increments the count of simultaneous units by the number of units associated with this time slot, and increments the count of simultaneous users by 1. (Note that the time slots which end in the future are not deleted from list 500 after they have been counted, in this second embodiment.) The updated count of simultaneous units and the updated count of simultaneous users are then stored into the usage counter object, and are also preferably returned to the invoking logic (Block 770).

Suppose, by way of illustration, that the number of simultaneous users on a previous iteration of the processing of FIG. 7 was determined to be 2. Using the sample list of FIG. 5A, Block 720 obtains a list comprising 5 time slots—namely, the 5 time slots shown in FIG. 5A as starting before the current time Tl. Further suppose that Block 730 determines that 2of those time slots have their end times in the past. Block 740 therefore deletes these 2 time slots from the list 500, resulting in the updated list 500' of FIG. 5B. For the 3 time slots that have their start times before the current time, but which remain on the list 500' after the processing of Block 740, the end time for these time slots is at some time in the future (that is, the simulated processing represented by this time slot is continuing). Accordingly, Block 750 detects that the end time for these 3 time slots is in the future, and Block 760 therefore increments the counts for each such time slot. The count of users is then 5, in this example, and this value is returned by Block 770.

As can be appreciated in view of the processing illustrated in FIG. 7, the processing when using this embodiment is relatively simple, and this embodiment uses less memory for storing the usage counter object (as contrasted to the first embodiment) since only one list is maintained instead of two. Processing time may be somewhat longer than in the first embodiment, due to evaluating the selected list entries to determine their end times. Deleting entries from the sorted list after the entry has ended serves to keep the lists relatively short.

As will be obvious to those of ordinary skill in the art, the processing of the lists 200, 210, and 500 may involve multiple time slots, and the processing of 420-470 of FIG. 4 and Blocks 730-760 of FIG. 7 may therefore iterate through the individual time slots, although this iteration has not been explicitly shown in FIGS. 4 and 7. One of ordinary skill in the art will readily understand how such iteration can be implemented, in view of the teachings disclosed herein.

For the above-described embodiments, the processing of either FIG. 4 or FIG. 7 may be invoked for a single resource. In another approach, the map of resources by type may be used to invoke the processing of FIG. 4 or FIG. 7 for each resource of a particular type.

Figure 8:
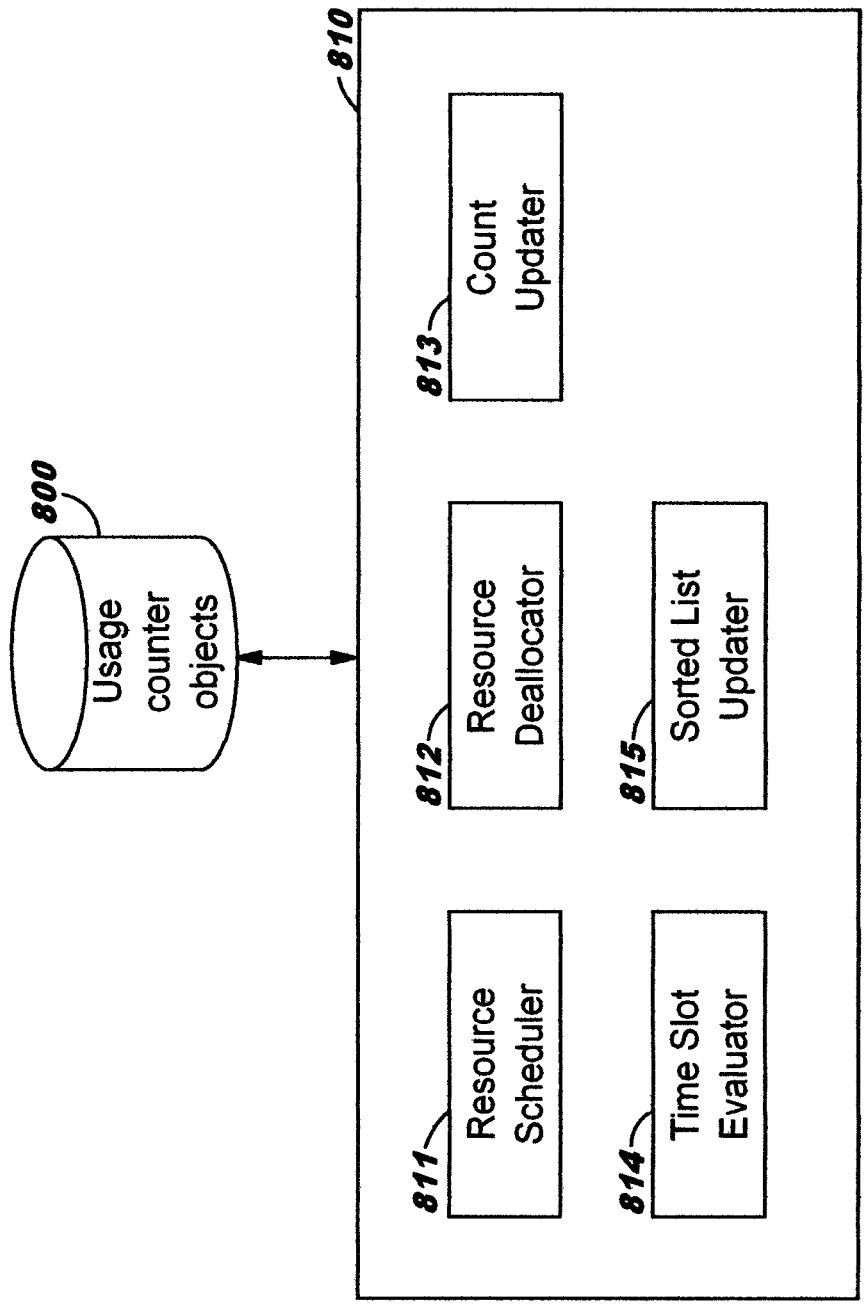
FIG. 8 depicts components which may be used in an implementation of the present invention.

FIG. 8 depicts components which may be used in an implementation of the present invention. One or more usage counter objects 800 are used as input to, and are updated as output from, processing component 810. Processing component 810 corresponds generally to the logic depicted in the flowcharts of FIGS. 3-4 and FIGS. 6-7. Accordingly, the resource scheduler 811 and the resource deallocator 812 may be used to implement the processing of FIG. 3 or FIG. 6. The count updater 813, the time slot evaluator 814, and the sorted list updater 815 may be used to implement the processing of FIG. 4 or FIG. 7.

Figure 9:
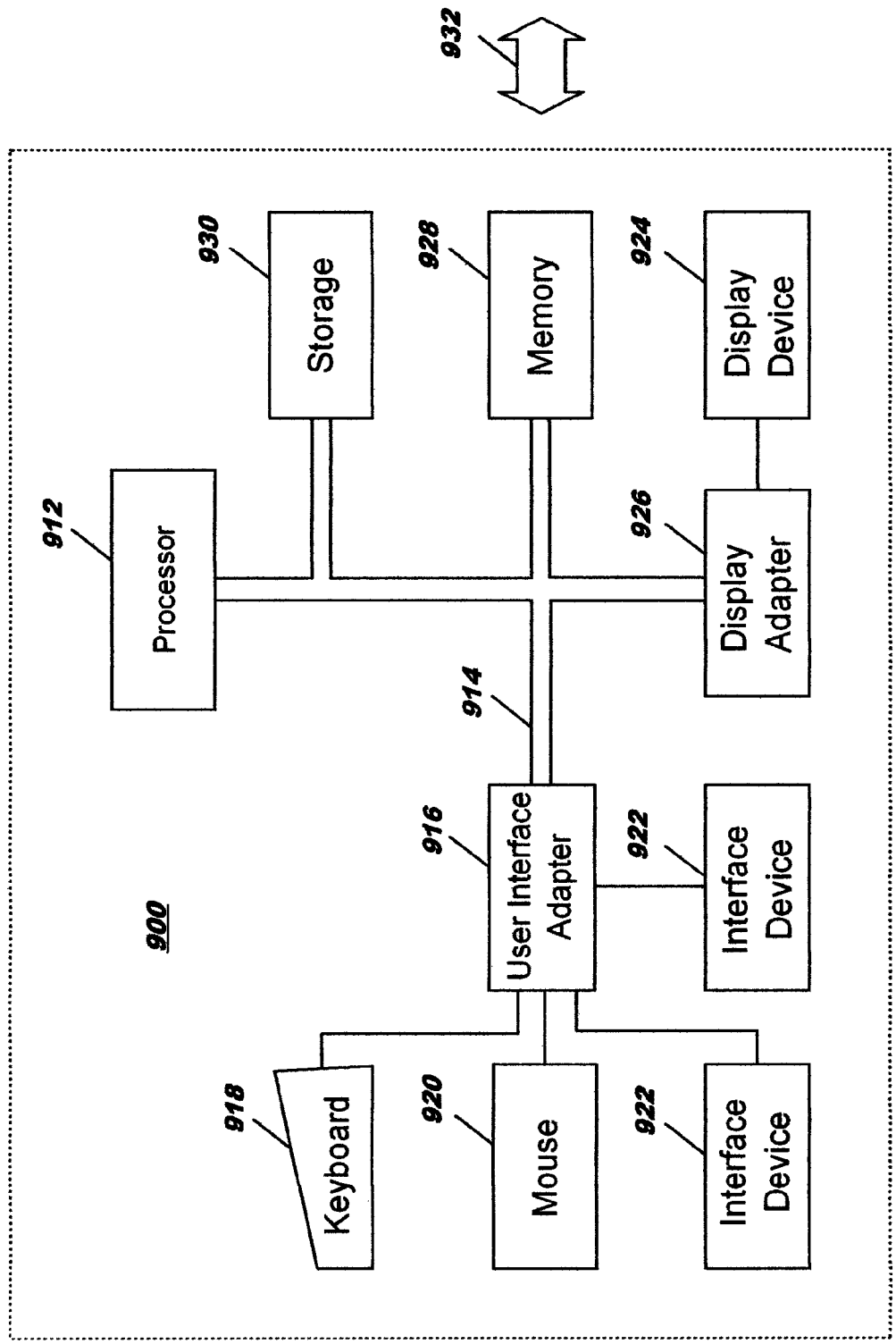
FIG. 9 depicts a data processing system suitable for storing and/or executing program code.

Referring now to FIG. 9, a data processing system 900 suitable for storing and/or executing program code includes at least one processor 912 coupled directly or indirectly to memory elements through a system bus 914. The memory elements can include local memory 928 employed during actual execution of the program code, bulk storage 930, and cache memories (not shown) which provide temporary storage of at least some program code in order to reduce the number of times code must be retrieved from bulk storage during execution.

Input/output ("I/O") devices (including but not limited to keyboards 918, displays 924, pointing devices 920, other interface devices 922, etc.) can be coupled to the system either directly or through intervening I/O controllers or adapters (916, 926).

Network adapters may also be coupled to the system to enable the data processing system to become coupled to other data processing systems or remote printers or storage devices through intervening private or public networks (as shown generally at 932). Modems, cable modem attachments, wireless adapters, and Ethernet cards are just a few of the currently-available types of network adapters.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

What invention claimed is:

1. A computer-implemented method of calculating resource usage for process simulation in a computing system, comprising performing, by a processor of the computer:

receiving, by the processor from an executing simulation engine, a request to perform a resource usage calculation for simulating execution of processing in the computing system; and responding to the received request by executing stored instructions, by the processor, that improve computational overhead of the resource usage calculation for the simulated execution by carrying out operations comprising:

accessing a usage counter object for a computing resource, the usage counter object stored in a storage device and comprising a sorted list of all scheduled time slots of the resource, each of the scheduled time slots representing a start time through an end time during which a single user is scheduled to use the resource and a number of units of the resource to be used in the time slot, the sorted list sorted by the start time of each of the scheduled time slots;

initializing a count of simultaneous units used for the resource and a count of simultaneous users of the resource to corresponding counts stored in respective counter fields in the usage counter object;

selecting, from the sorted list, all of the scheduled time slots for which the start time is less than a current time;

for each of the selected time slots for which the end time thereof is greater than the current time, incrementing the count of simultaneous units used for the resource by the number of units represented by the selected time slot and incrementing the count of simultaneous users of the resource by one and storing the incremented counts in the respective counter fields in the usage counter object, and otherwise, updating the usage counter object by deleting the selected time slot from the sorted list stored therein; and returning, from the processor to the executing simulation engine as a response to the received request, the count of simultaneous units used for the resource and the count of simultaneous users of the resource stored in the respective counter fields in the usage counter object.

2. The method according to claim 1, wherein the operations further comprise:

adding a corresponding time slot to the sorted list stored in the usage counter object, responsive to detecting each scheduling of the resource, the added corresponding time slot representing the start time through the end time at which the resource is scheduled; and deleting a corresponding time slot from the sorted list stored in the usage counter object, responsive to detecting each deallocation of the resource.

3. A computer-implemented method of calculating resource usage for process simulation in a computing system, comprising performing, by a processor of the computer:

receiving, by the processor from an executing simulation engine, a request to perform a resource usage calculation for simulating execution of processing in the computing system; and responding to the received request by executing stored instructions, by the processor, that improve computational overhead of the resource usage calculation for the simulated execution by carrying out operations comprising:

accessing a usage counter object for a computing resource, the usage counter object stored in a storage device and comprising a first sorted list for the resource and a second sorted list for the resource, wherein:

the first sorted list comprises an entry for all scheduled time slots of the resource, each of the scheduled time slots representing a start time through an end time during which a single user is scheduled to use the resource and a number of units of the resource to be used in the time slot, the first sorted list sorted by the start time of each of the scheduled time slots; and the second sorted list comprises an entry for all of the scheduled time slots of the resource, the second sorted list sorted by the end time of each of the scheduled time slots;

initializing a count of simultaneous units used for the resource and a count of simultaneous users of the resource to corresponding counts stored in respective counter fields in the usage counter object;

selecting, from the first sorted list, all of the scheduled time slots for which the start time is less than a current time;

for each of the time slots selected from the first sorted list, incrementing the count of simultaneous units used for the resource by the number of units represented by the selected time slot and incrementing the count of simultaneous users of the resource by one and storing the incremented counts in the respective counter fields in the usage counter object, and then updating the usage counter object by deleting the selected time slot from the first sorted list stored therein;

selecting, from the second sorted list, all of the scheduled time slots for which the end time is less than or equal to the current time;

for each of the time slots selected from the second sorted list, decrementing the count of simultaneous units used for the resource by the number of units represented by the selected time slot and decrementing the count of simultaneous users of the resource by one and storing the decremented counts in the respective counter fields in the usage counter object, and then updating the usage counter object by deleting the selected time slot from the second sorted list stored therein; and returning, from the processor to the executing simulation engine as a response to the received request, the count of simultaneous units used for the resource and the count of simultaneous users of the resource stored in the respective counter fields in the usage counter object.

4. The method according to claim 3, wherein the operations further comprise:
for each detected scheduling of the resource, adding a corresponding time slot to the first sorted list according to the start time of the detected scheduling, the added time slot representing the start time through the end time at which the resource is scheduled according to the detected scheduling, and adding the corresponding time slot to the second sorted list according to the end time of the detected scheduling; and
for each detected deallocation of the resource, deleting a corresponding time slot from the first sorted list and deleting the corresponding time slot from the second sorted list.

5. The method according to claim 3, wherein the operations further comprise:
determining that the received request requests that the resource usage calculation be performed for all resources of a selected type;
consulting a stored mapping that identifies computing resources by type; and
calculating the resource usage for a plurality of resources of the selected type, further comprising:
accessing the mapping, using the selected type, to identify the plurality of resources; and
for each of the identified plurality of resources, iteratively executing:
the accessing the usage counter object;
the initializing;
the selecting from the first sorted list;
the incrementing the count of simultaneous units used, the incrementing the count of simultaneous users, the storing the incremented counts, and the updating by deleting the selected time slot from the first sorted list;
the selecting from the second list; and
the decrementing the count of simultaneous units used, the decrementing the count of simultaneous users, the storing the decremented counts, and the updating by deleting the selected time slot from the second sorted list.

6. A system for calculating resource usage for process simulation in a computing system, comprising:
a computer comprising a processor; and
instructions which are executable, using the processor, to implement functions comprising:
maintaining a sorted list of all scheduled time slots of a resource, each of the scheduled time slots representing a start time through an end time during which a single user is scheduled to use the resource and a number of units of the resource to be used in the time slot, the sorted list sorted by the start time of each of the scheduled time slots;
initializing a count of simultaneous units used for the resource and a count of simultaneous users of the resource;
selecting, from the sorted list, all of the scheduled time slots for which the start time is less than a current time; and
for each of the selected time slots for which the end time thereof is greater than the current time, incrementing the count of simultaneous units used for the resource by the number of units represented by the selected time slot and incrementing the count of simultaneous users of the resource by one, and otherwise, deleting the selected time slot from the sorted list, thereby improving computational overhead of calculating the resource usage for the process simulation.

7. The system according to claim 6, wherein maintaining the sorted list further comprises:
adding a corresponding time slot to the sorted list, responsive to each scheduling of the resource, the added corresponding time slot representing the start time through the end time at which the resource is scheduled; and
deleting a corresponding time slot from the sorted list, responsive to each deallocation of the resource.

8. The system according to claim 6, wherein:
initializing the count of simultaneous units used for the resource comprises initializing the count of simultaneous units used for the resource to a value previously computed by the incrementing the count of simultaneous units used for the resource; and
initializing the count of simultaneous users of the resource comprises initializing the count of simultaneous users of the resource to a value previously computed by the incrementing the count of simultaneous users of the resource.

9. The system according to claim 6, wherein the sorted list, the count of simultaneous units used for the resource, and the count of simultaneous users of the resource are stored in a usage counter object for the resource.

10. A computer program product for calculating resource usage for process simulation in a computing system, the computer program product comprising:
a computer readable storage medium having computer readable program code embodied therein, the computer readable program code configured for:
maintaining a first sorted list of all scheduled time slots of a resource, each of the scheduled time slots representing a start time through an end time during which a single user is scheduled to use the resource and a number of units of the resource to be used in the time slot, the first sorted list sorted by the start time of each of the scheduled time slots;
maintaining a second sorted list of all of the scheduled time slots of the resource, the second sorted list sorted by the end time of each of the scheduled time slots;
initializing a count of simultaneous units used for the resource and a count of simultaneous users of the resource;
selecting, from the first sorted list, all of the scheduled time slots for which the start time is less than a current time;
for each of the time slots selected from the first sorted list, incrementing the count of simultaneous units used for the resource by the number of units represented by the selected time slot and incrementing the count of simultaneous users of the resource by one and then deleting the selected time slot from the first sorted list;
selecting, from the second sorted list, all of the scheduled time slots for which the end time is less than or equal to the current time; and
for each of the time slots selected from the second sorted list, decrementing the count of simultaneous units used for the resource by the number of units represented by the selected time slot and decrementing the count of simultaneous users of the resource by one and then deleting the selected time slot from the second sorted list, thereby improving computational overhead of calculating the resource usage for the process simulation.

11. The computer program product according to claim 10, wherein:
for each scheduling of the resource, the maintaining the first sorted list further comprises adding a corresponding time slot to the first sorted list, the added time slot representing the start time through the end time at which the resource is scheduled, and the maintaining the second sorted list further comprises adding the corresponding time slot to the second sorted list; and
for each deallocation of the resource, the maintaining the first sorted list further comprises deleting a corresponding time slot from the first sorted list and the maintaining the second sorted list further comprises deleting the corresponding time slot from the second sorted list.

12. The computer program product according to claim 10, wherein:
initializing the count of simultaneous units used for the resource comprises initializing the count of simultaneous units used for the resource to a value previously computed by the incrementing the count of simultaneous units used for the resource and then decrementing the count of simultaneous units used; and
initializing the count of simultaneous users of the resource comprises initializing the count of simultaneous users of the resource to a value previously computed by the incrementing the count of simultaneous users of the resource and then decrementing the count of simultaneous users of the resource.

13. The computer program product according to claim 10, further comprising computer readable program code configured for:
maintaining a mapping of resources by type; and
calculating the resource usage for a plurality of resources of a selected type, further comprising:
accessing the mapping, using the selected type, to identify the plurality of resources; and
for each of the identified plurality of resources, iteratively executing:
the selecting from the first sorted list;
the incrementing the count of simultaneous units used, the incrementing the count of simultaneous users, and the deleting the selected time slot from the first sorted list;
the selecting from the second list; and
the decrementing the count of simultaneous units used, the decrementing the count of simultaneous users, and the deleting the selected time slot from the second sorted list.

* * * * *